United States Patent [19]

Keeler

[11] Patent Number: 5,181,135
[45] Date of Patent: Jan. 19, 1993

[54] OPTICAL UNDERWATER COMMUNICATIONS SYSTEMS EMPLOYING TUNABLE AND FIXED FREQUENCY LASER TRANSMITTERS

[75] Inventor: R. Norris Keeler, McLean, Va.

[73] Assignee: Kaman Aerospace Corporation, Bloomfield, Conn.

[21] Appl. No.: 632,398

[22] Filed: Dec. 21, 1990

[51] Int. Cl.⁵ .............................................. H04B 10/00
[52] U.S. Cl. .................................... 359/141; 356/342; 372/20
[58] Field of Search ............................ 455/604; 358/95; 356/342; 372/20, 32; 359/141, 155, 185, 161

[56] References Cited

U.S. PATENT DOCUMENTS

| | | | |
|---|---|---|---|
| 4,727,552 | 2/1988 | Porte et al. ........................... | 372/20 |
| 4,764,982 | 8/1988 | Pfund ................................... | 359/141 |
| 4,823,354 | 4/1989 | Znotins et al. ...................... | 372/20 |
| 4,862,257 | 8/1989 | Ulich .................................... | 358/95 |
| 4,962,503 | 10/1990 | Liu et al. ............................. | 372/72 |
| 4,963,024 | 10/1990 | Ulich .................................... | 356/342 |
| 4,964,721 | 10/1990 | Ulich et al. .......................... | 358/95 |
| 4,967,270 | 10/1990 | Ulich et al. .......................... | 358/95 |
| 5,013,917 | 5/1991 | Ulich .................................... | 358/95 |
| 5,034,810 | 7/1991 | Keeler .................................. | 358/95 |
| 5,038,406 | 8/1991 | Titterton et al. ..................... | 359/141 |

Primary Examiner—Edward L. Coles, Sr.
Assistant Examiner—Kinfe-Michael Negashi
Attorney, Agent, or Firm—Fishman, Dionne & Cantor

[57] ABSTRACT

The present invention uses tunable and fixed frequency lasers as an optical light source in underwater communications systems. This invention provides a high energy, short pulse length laser output which is tunable to or set at a desired wavelength. The tuning is used for performance optimization of the communications systems. An example of performance optimization is the tuning to or setting of the laser at the so-called Jerlov minimum, which is dependent upon the optical characteristics of the particular water used. The system described herein is used as an optical communications downlink employing one or more atomic resonance filter detectors. This invention has the effect of significantly improving the optical signal to noise ratio.

30 Claims, 7 Drawing Sheets

OPTICAL UNDERWATER COMMUNICATIONS SYSTEMS EMPLOYING TUNABLE AND FIXED FREQUENCY LASER TRANSMITTERS

CROSS-REFERENCE TO RELATED APPLICATION

This application is related to U.S. application Ser. No. 632,377 filed contemporaneously herewith now U.S. Pat. No. 5,091,778 entitled "Imaging Lidar Systems and K-Meters Employing Tunable and Fixed Frequency Laser Transmitters" invented by R. Norris Keeler.

BACKGROUND OF THE INVENTION

This invention relates generally to a method and apparatus for remote imaging of objects enveloped by a backscattering medium which is at least partially transmitting to light. More particularly, this invention relates to a method for detecting and imaging underwater objects from an airborne platform or from a submarine using a novel imaging lidar (light detection and ranging) system which employs a laser system as an optical light source for operation at light wavelengths optimized for maximum transmissivity in the ocean or other bodies of water. This invention also relates to laser systems for use in (1) the remote detection of the diffuse attenuation coefficient or K factor; and (2) submarine communications between both underwater and above-water locations. In addition, the laser systems associated with this invention are capable of operation at a number of frequencies thereby providing a wavelength range for operating at the optimum wavelength which is dependent upon the optical transmissivity of the body of water.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and of course, are easily subject to damage and loss. Also, wire line devices make target searching relatively slow and can only detect targets without providing visual imaging.

An important and novel system for remote detection and imaging of objects underwater (or objects obscured by other backscattering media which is at least partially transmitting to light such as ice, snow, fog dust and smoke) from an airborne platform has been described in U.S. Pat. No. 4,862,257 and U.S. patent application Ser. No. 256,778 filed Oct. 12, 1988, now U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. application Ser. No. 256,778 now U.S. Pat. No. 5,013,917 relates to an imaging lidar system intended for night vision.

Imaging lidar systems of the type described hereinabove are also disclosed in commonly assigned U.S. Pat. Nos. 4,964,721 and 4,967,270, both of which are assigned to the assignee hereof and fully incorporated herein by reference. U.S. Pat. No. 4,964,721 relates to an imaging lidar system which controls camera gating based on input from the aircraft onboard altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

USSN 565,631 filed Aug. 10, 1990 which is also assigned to the assignee hereof and fully incorporated herein by reference, relates to an airborne imaging lidar system which employs multiple pulsed laser transmitters, multiple gated and intensified array camera receivers, an optical scanner for increased field of regard, and a computer for system control, automatic target detection and display generation. USSN 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

U.S. Pat. No. 4,963,024 (which is also assigned to the assignee hereof and incorporated herein by reference) relates to a laser based optical system of the type described above used for remote detection of the diffuse attenuation coefficient or $K_s$ factor over very large areas and over relatively short time periods. In accordance with U.S. Pat. No. 4,963,024, a laser is used to generate short pulses (e.g., about less than 10 nm) of light with pulse widths on the order of nanoseconds. The laser light is expanded by optics and projected down toward the surface of the water. An intensified CCD (charge coupled device) camera is electronically shuttered after an appropriate time delay such that the image formed by the camera is composed of light backscattered by the water from a layer of range z and a thickness of delta Z. The signal detected by the camera is $S_i$. If several measurements of $S_i$ are made at known time delay differences such that the differences of range gates $z_i$ are also known, then K can be calculated. This just described optical system thus functions as a K-meter.

While well suited for its intended purposes, the above-described imaging lidar systems utilize lasers which do not operate at the optimum wavelength for light propagation in the ocean and cannot reach the acceptance frequencies required by certain optical receivers. As a consequence of the drawbacks of these presently available lidar systems, the resolution of objects below certain depths in the ocean is not satisfactory. This problem is particularly troublesome as there is a perceived need to detect submerged objects at ocean depths of up to several hundred feet. In addition, there is also a perceived need to improve the accuracy and depth capability of the K-factor measurement derived from K-meters of the type described in U.S. Pat. No. 4,963,024.

SUMMARY OF THE INVENTION

The above-discussed and other drawbacks and deficiencies of the prior art are overcome or alleviated by the present invention which uses tunable and fixed frequency lasers as an optical light source in imaging laser detection and ranging (LIDAR) systems as well as underwater communications systems and K-meters This invention provides a high energy, short pulse length laser output which is tunable to or set at a desired wavelength (typically in the blue region of the visible optical spectrum (400-480 nm)). The tuning is used for performance optimization of lidar or communications systems; and for scientific investigations carried out using these systems. An example of performance optimization is the tuning to or setting of the laser at the so-called Jerlov minimum, which is dependent upon the optical characteristics of the particular water used. The improved system may be used for scientific investigation, such as determining $K_s$ the optical attenuation coefficient in the ocean at depth, as well as imaging various opaque objects under battlefield conditions, at depth. The lidar systems described herein can also be used as an optical communications downlink. This invention has the effect of significantly improving the optical signal to noise ratio for all of these applications.

The lidar system of this invention is substantially similar to the lidar system of U.S. Pat. Nos. 4,862,257 and 4,967,270 with the primary distinction that flashlamp solid state or excimer pumped tunable dye lasers, diode and flashlamp pumped solid state lasers, diode pumped solid state lasers, solid state pumped solid state lasers and/or excimer lasers operating on the (C to A) transition are installed at the front end of the system and tuned to or set at the desired wavelength, by the usual electro-optic techniques. The laser light is generated in the form of short pulses (nanoseconds or greater in duration), expanded by optics, projected below the surface of the water (e.g., ocean) onto various objects, natural or man made. At the same time, one (or more) CCD cameras are shuttered and gated to correspond to the round trip travel time and the thickness of the section of the ocean observed. Upon return, the light is filtered and delivered to the camera.

The present invention thus provides a means by which optical imaging can be done at depths two to three times greater than is possible with presently operating systems. This system also permits scientific investigations (such as the determination of the $K_s$ factor) at deeper depths. This invention also provides an optical system for submarine communications which employs a laser which may be tuned to or set at the acceptance frequency of an atomic resonance filter such as the filter-detector described in U.S. Pat. No. 4,292,526, all of the contents of which are incorporated herein by reference.

The above-discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

The present invention provides a tunable and/or fixed frequency laser light source for use in both underwater lidar and underwater communications applications. Tunability (or the ability to alter and fix the wavelength to a set frequency) is important for imaging lidar and underwater communications applications, since it is desirable to have an illuminating light source which operates at a light wavelength which has the best transmission characteristics for the type of water in which operation is desired. For the communications application, the transmitting or illuminating laser must not only be tuned or set to the optimum wavelength for transmission, it must also be tuned or set to the middle of the acceptance bandwidth of the filter receiver (such as the atomic resonance filter-receiver described in U.S. Pat. No. 4,292,526). Preferably, the filter receiver is selected for operation at or near the wavelength for optical transmission through the water, so that it is the acceptance frequency of the filter which determines the laser transmitter wavelength for this (communications) application.

Figure 1A:
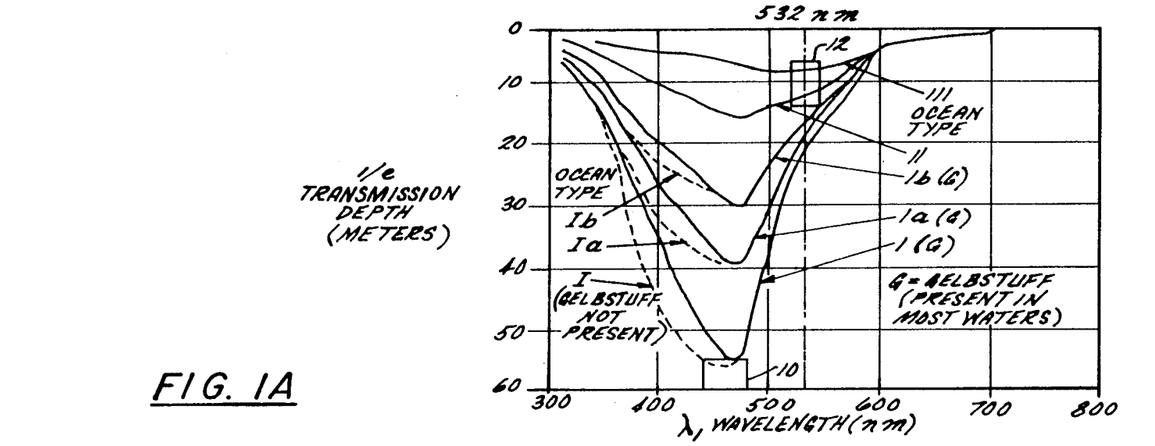
FIG. 1A is a graph depicting the optical transmission characteristics of the ocean in the visible wavelength as a function of wavelength, the graph of FIG. 1 being commonly known as a Jerlov chart.

Referring to FIG. 1A, the transmission depth in meters is plotted against wavelength ($\lambda$) for various classes of ocean water, designated as I, $I_A$, $I_B$, II and III. FIG. 1A is commonly known as a Jerlov chart. Transmission of light in the ocean depends on the frequency of the light and the type of water, or "Jerlov Class" (see generally N. G. Jerlov, *Marine Optics*, Elsevier Oceanography Series, 14, Elsevier Scientific Publishing Company (1976); R. W. Austin and T. J. Petzold, *Spectral Dependence of the Diffuse Attenuation Coefficient of Light in Ocean Waters*, Optical Engineering, March 1986 (Vol. 25, No. 3, pp. 471-479)). The clearer the water, the lower the Jerlov Class number. For example, with reference to FIG. 1A, Jerlov Class I water reduces an incoming 470 nm laser pulse to 1/e (1/2.72=0.368) of its initial intensity after passing through 190 feet (58 meters) of sea water of this (Class I) Jerlov classification. Other less clear waters will attenuate light pulses more strongly, with maximum transmission occurring at progressively longer wavelengths, and with less frequency dependence. Most investigators agree on the general shape of these curves. For the most transparent of waters (Class 1) the presence of certain suspended organic material called "gelbstoff" causes a loss in transmissivity at wavelengths shorter than the Jerlov minimum. This material is normally found in clear water closer to land masses or in enclosed bodies of water. This situation is shown by the two curves for classes 1, $1_a$ and $1_b$ water shown in FIG. 1A.

In the open ocean, most of the Jerlov measurements are carried out using Secchi Discs, at 100 to 200 feet. This reflects the optical transmissivity down to those shallow depths. In most turbid waters, the optical absorption takes place in the thermocline and is due to biologics which exist at these shallow depths. In accordance with an important feature of the present invention, a laser-based optical system is provided which obtains remotely measured $K_a$ (attenuation) values at all visible frequencies at depths below the thermocline. The imaging approach of this invention makes it possible to eliminate many of the failings of the non-imaging lidar approaches (see e.g., Raytheon Company Final Report "Pulsed Light Airborne Depth Sounding (PLADS) System", Apr. 30, 1970).

For the most clear water, a region 10 exists where optimum transmission is obtained. A transmitter operating in this region will be able to penetrate the ocean at least 50 meters before it is attenuated 1/e of its initial intensity as it enters the ocean. In accordance with another important feature of the present invention, it has been discovered that a laser transmitter operating in the deep ocean be tuned to or set to operate at frequencies in that optical region. For the shallow or littoral water applications, the water is normally of a much poorer quality, Class 111 or worse. Here, the frequency dependence is much less pronounced, with a broad minimum at the longer wavelengths, in region 12. Since pulsed lasers operating at this wavelength are generally far more efficient and more technologically mature, they are to be desired for the shallow water application. Finally, it should be pointed out that even in deep ocean areas where the water above the thermocline may have worse transmission properties than Class 1, below the thermocline all deep ocean water is Class 1, at least down to the deep scattering layer (about 1100 feet).

Figure 1B:
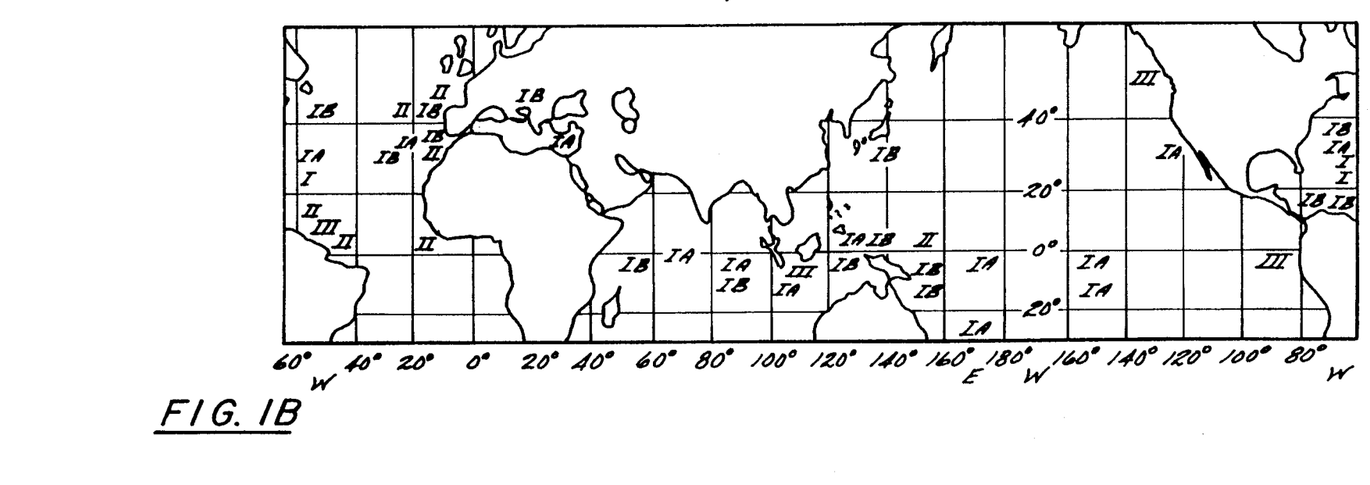
FIG. 1B is a map showing geographical locations for selected examples of classes of water throughout the world.

Referring to FIG. 1B, the regions in the world and their water classes are shown. Most of the open ocean is Class 1A and 1B water, with regions such as the Sargasso Sea 14 and the Eastern Mediterranean 16 representing very clear open ocean water, and the region off the Amazon Delta 18 and the Galapagos Islands off Ecuador 20 representing ocean water with much poorer transmission characteristics.

Figure 2:
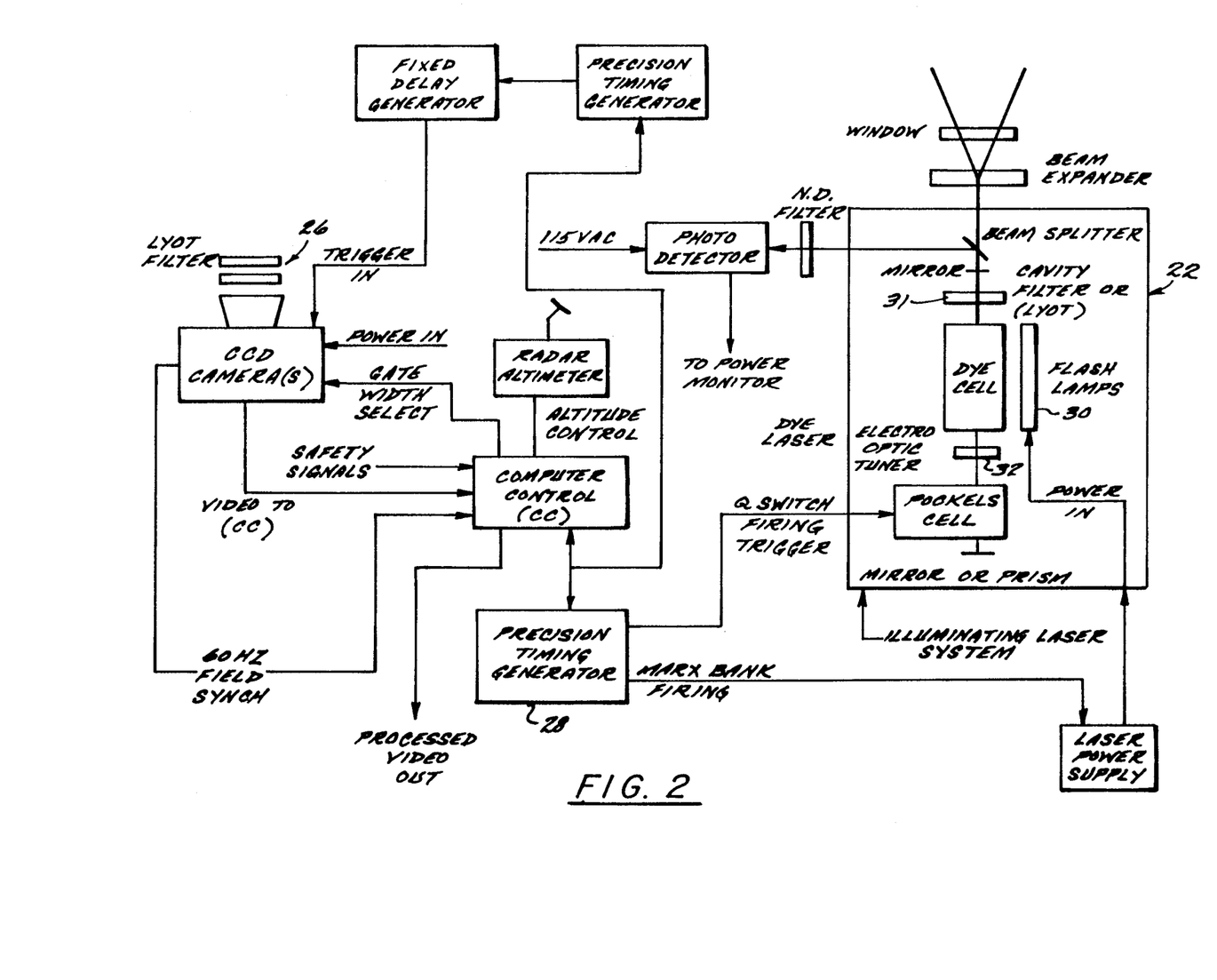
FIG. 2 is a block diagram depicting a lidar system in accordance with the present invention which employs a flashlamp pumped dye laser illuminating the visual field of view for the imaging camera.

An overall schematic of one preferred embodiment of the present invention is shown in FIG. 2. With the exception of the laser transmitter 22, the several components of the lidar system of FIG. 2 are substantially similar to the lidar system components described in U.S. Pat. Nos. 4,862,257 and 4,964,721. As mentioned, the significant difference in the lidar system of of this invention is the employment of a laser transmitter which may be tuned to or set at an optimally desired wavelength. In the embodiment described in FIG. 2, such a laser transmitter comprises a flashlamp pumped dye laser 22. Laser 22 can generate short pulses of light of less than 500 nsec in duration. The laser light beam is directed onto the surface of a body of water. Intensified CCD cameras 24 are focused on the desired image plane. The cameras are gated by pulse timing generators set to a time delay corresponding to the round trip distance to the target. The vertical distance in feet imaged is equal to 1/n with n being the refractive index of sea water times the gate width divided by two. The gated volume is bounded by this vertical distance in feet, and that horizontal area of laser illuminated water that is within the view of the camera(s). The volume imaged by this procedure can be recorded on video tapes and presented on an appropriate video display.

The laser transmitter component 22 of the system in FIG. 2 may be considered modular to the overall system, barring slightly altered power requirements and output wavelength which requires Lyot filters 26 consistent with the particular wavelength used. The schematic of FIG. 2 taken together with prior U.S. Pat. Nos. 4,862,257 and 4,964,721 readily provide a description of this imaging lidar system to one of ordinary skill in the art. However, it is instructive to describe the interfaces of the laser with the system. The precision timing generator 28 triggers the Marx bank discharge across the flashlamps 30 which pump the dye laser. For the applications discussed herein, an appropriate dye would be, for example, Coumarin 480 or Coumarin 460. The 480 and 460 represent the light wavelengths in nanometers at which each laser dye transmits. In the cavity is a Pockels Cell used to Q-switch out the pulse (and thereby shorten the pulse). A Lyot cavity filter 31 is employed when a fixed frequency is desired; and an electro-optic tuner 32 is employed when tuning is desired during operation. A typical tuning range for Coumarin 460 would be 420 nm to 500 nm. It should be noted that if tuning is carried out during the course of a given operation, that operation must be done in the absence of sunlight, since tuning would require a narrow band filter with variable central frequency at the receiving optics of the camera. However, two or three frequency narrow bandpass filters could be remotely switched into place allowing a number of frames (or oceanographic optical measurements) to be obtained at discrete wavelengths in the tuning range of the laser transmitter. This would allow daytime operation. As stated, other elements in the cavity 22 are similar to those described in the aforementioned patents.

The lidar system can be operated at night or during the daytime. During daylight hours a Lyot (birefringement) or atomic resonance filter 26 must be used. These filters are lossy, depending on their acceptance angle and acceptance bandwidths.

Figure 3:
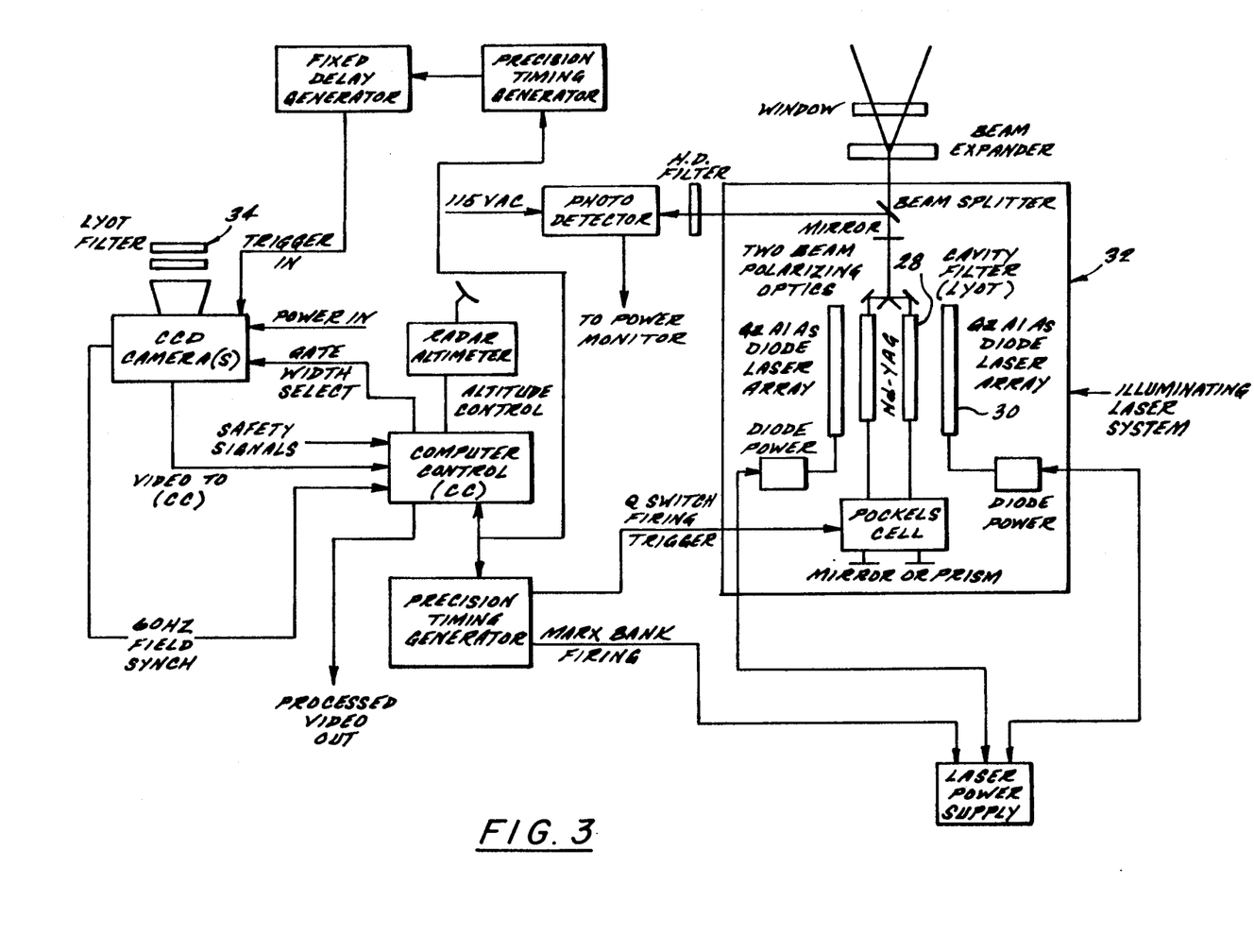
FIG. 3 is a block diagram depicting a lidar system in accordance with the present invention which employs a diode laser pumped solid state laser such as Neodymium YAG (Yttrium Aluminum Garnet/Nd+ + +)

Referring now to FIG. 3, a preferred embodiment of the present invention which is particularly well suited for operation in water with poorer transmission characteristics (e.g., Class I) is shown. Here, a Nd:YAG laser 28 pumped by a Gallium Aluminum Arsenide diode laser array 30 is inserted in the system 32 in place of the previously used flashlamp pumped laser 22 shown in FIG. 2. This substitution leads to a tremendous improvement in wallplug efficiency, compactness, stability and longevity. At present, laser diodes are available with approximately 40% efficiency in the IR. Since the output of these diodes is directly in the pump band of Nd YAG, the pumping efficiency for Nd:YAG is approximately 30%. Doubling efficiencies of up to 40% can be attained and there have been some reports of efficiencies as high as 50%. Therefore the overall wallplug efficiency of this type of system, including doubling the 1.06 output to 530 nm in the green is in the vicinity of 4-5%, with 3% easily attained. This is a greater than tenfold increase over the flashlamp pumped Nd:YAG efficiency in the green of 0.25%. The reason for this great increase in efficiency is that the pumping of the Nd:YAG laser by flashlamps is grossly inefficient because only a small part of the black body output of the flashlamps can be used, while as pointed out before, even though electrical input-optical radiation output of flashlamps is higher (70%) than the laser diode efficiency (40%) the diode laser output is centered in the pump band of the Nd:YAG laser. Laser diodes have exhibited lifetimes in the order of $10^9$ shots in continuous pulsed operation with no degradation, while the best flashlamps are good for only slightly better than $10^7$ shots. The absence of flashlamps reduces the amount of electromagnetic interference present, and the other disadvantages of high voltage pulse operation such as uv radiation and high temperatures. The simple mounting configuration contributes to much greater stability under all operating conditions.

The operation of the lidar system of FIG. 3 is the same as shown in FIG. 2 with the exception that much less power is required to pump the laser system, and since the transmitter output wavelength does not vary, a Lyot filter 34 centered at a wavelength of 532 nm is used at the imaging camera input optics to exclude sunlight during daytime operations.

Figure 4:
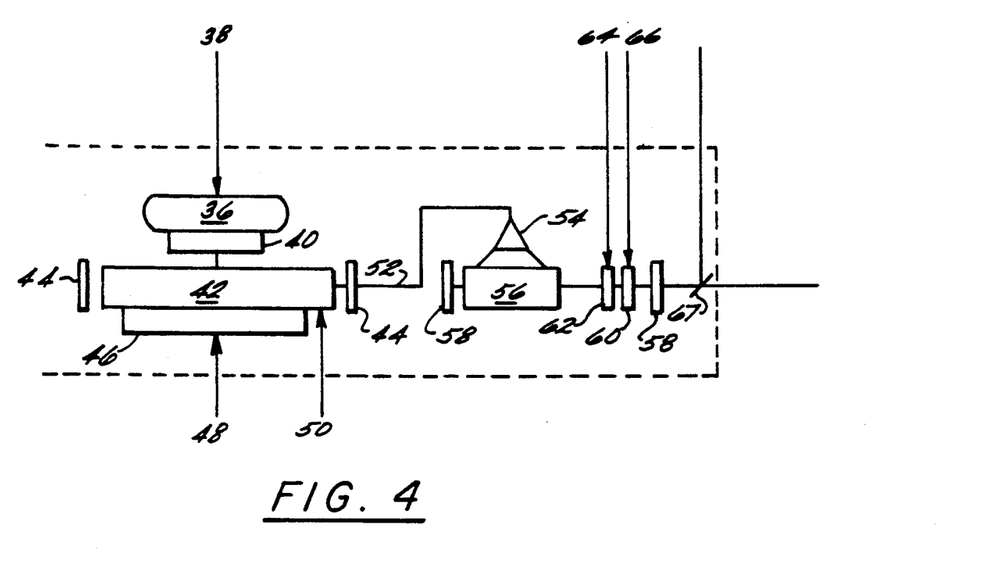
FIG. 4 is a block diagram of a portion of a lidar system of the present invention depicting an excimer laser pumped dye laser cell.

Referring to FIG. 4 and in accordance with another embodiment of this invention, an excimer laser is shown as a pumping source for a tunable dye laser. The excimer laser is a discharge pumped X-ray preionized XeCl laser, operating at 308 nm. This is well within the pump band of dye lasers operating in the blue green wavelength regions using Coumarin 480, for example. Power is supplied to the pulse forming network (PNF) 36 from the laser power supply output 38. The PFN can be of the solid state type or a self healing liquid PFN. The pulses are then switched out by the switch 40 to electrodes inside the excimer laser cavity 42, bounded by mirrors 44 where they discharge into and excite the excimer gas mixture, producing the lasing medium. Commonly used switches are the thyratron switch, the magnetic switch and the rail gap switch. The lasing gas mixture is preconditioned by the x-ray preionizer 46, and its external power source 48. Parasitic power 50 is also required for the gas and cooling water circulating systems, integral with the cavity. The uv light pulse 52 (typically 308 nm, for the XeCl laser, although wavelengths of 193 nm, 248 nm and 351 nm are also available form ArF, KrF and XeF respectively) is then expanded by the coupling optics 54 thus irradiating the dye solution 56 in the dye laser cavity bounded by mirrors 58. Also in the cavity are the Q-switch 60 and the electro-optic tuner 62 with their respective controls and inputs 64 and 66. Blue light then proceeds across the boundary of the transmitter module to the output optics as shown in FIGS. 2 and 3. A small amount of light is diverted by beam splitter 67 back to the power monitor for continuous recording of the laser output.

Figure 5:
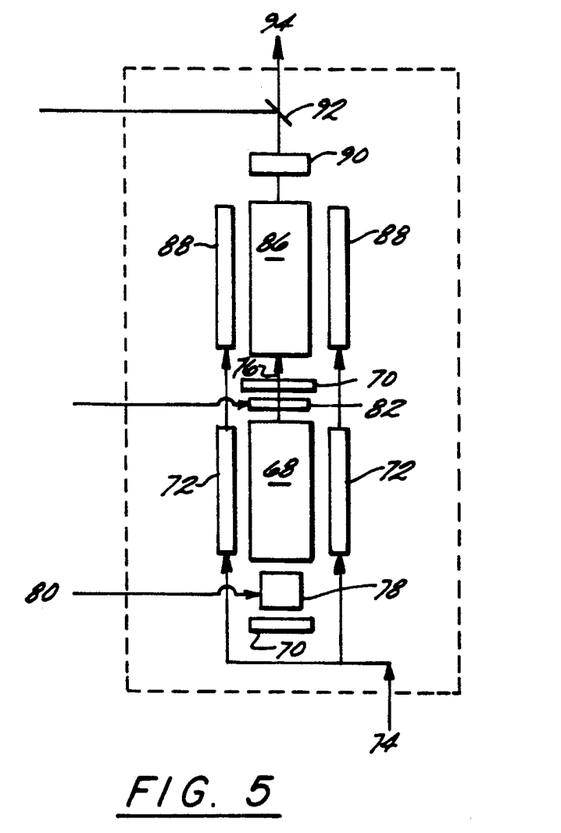
FIG. 5 is a block diagram of a portion of a lidar system in accordance with the present invention employing a flashlamp pumped tunable, frequency doubled solid state laser operating on a vibronic transition (e.g., Titanium Sapphire, Alexandrite or Lithium Strontium Aluminum Fluoride/Lr+ + +(LiSAF))

Referring to FIG. 5 and in accordance with still another embodiment of this invention, a flashlamp pumped solid state laser system operating on a vibronic transition (e.g., TiSapphire, Alexandrite and Cr:LiSAF) is shown. The system of FIG. 5 is a "master oscillator power amplifier" or "MOPA" configuration. Master oscillator is commonly referred to as "MO" and power amplifiers as "PA". A master oscillator with two power amplifiers following in series would be called a "MOPAPA" configuration. Any of the preferred embodiments described herein could be any combination of power amplifiers with a given master oscillator. Lasers operating on vibronic transitions normally have broad absorption bands in the visible, so that they can be pumped by flashlamps, (as compared to Nd:YAG which has narrow pump bands in the near IR). The master laser oscillator 68 in its cavity bounded by mirrors 70 is pumped by flashlamps 72 powered by a line 74 from the laser power supply. Laser light pulses 76 are switched out by the Q-switch 78 controlled from the Q-switch firing trigger through the trigger line 80. The Q-switch firing trigger control originates in the precision timing generator shown in the overall schematics of FIGS. 2 and 3. The master oscillator output wavelength is controlled at 82 by external input through the control line 84. Control 82 can be electro-optically tuned, or it can be a feedback loop with a matched atomic resonance filter as a control element. The latter configuration is the preferred embodiment when the system is communicating with a undersea platform utilizing the atomic resonance filter receiver, as will be described in more detail with regard to FIG. 8. The term "matched" refers to the fact that the atomic vapor in the control element is identical with the metal vapor in the filter receiver, thus providing an absolutes standard for the matching of the transmitter output wavelength to the receiver acceptance wavelength. The frequency control can be accomplished in a number of ways, including using the control element in a Hansch oscillator. The output pulse train is then amplified by the amplifier 86, pumped by the flashlamps 88, supplied by the same power lines 74 used for the oscillator flashlamps 72. The amplified pulses are then doubled in frequency by the frequency doubling crystal 90, which can be any one of a number of materials (eg., beta barium borate "BBO", Lithium borate ("LIBO") potassium dihydrogen phosphate "KDP", and potassium titanyl phosphate "KTP" are all well known examples of such crystals). A small amount of light is diverted by a beam splitter 92 back to the power monitor, continuously recording the laser operation. The laser light pulses 94 then are transmitted through the output optics consisting of the beam expander and window.

Figure 6:
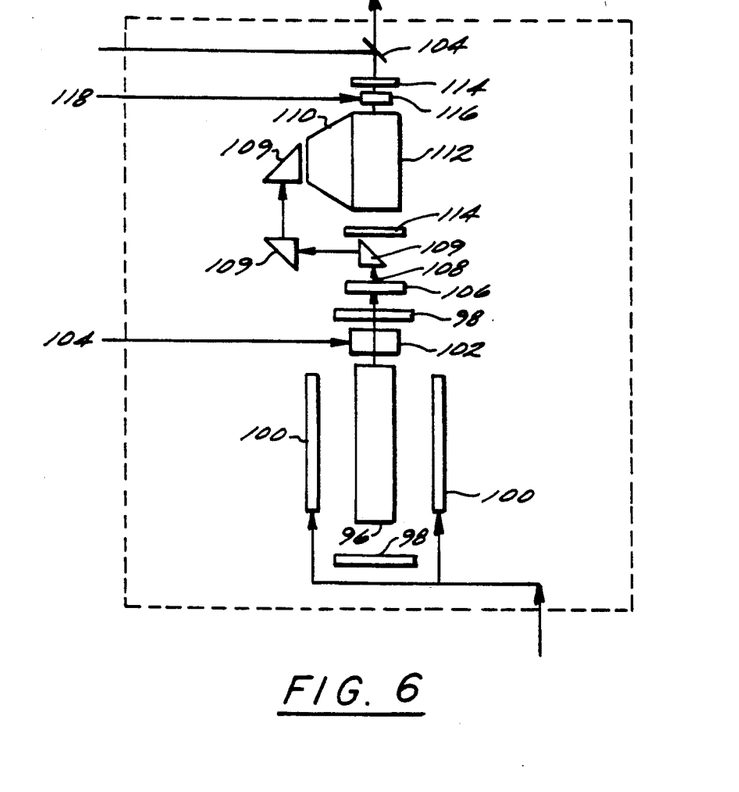
FIG. 6 is a block diagram of a portion of a lidar system in accordance with the present invention depicting a flash lamp or diode pumped frequency doubled or tripled solid state laser (e.g., alexandrite or Neodymium aluminum garnet-YAG) to pump the tunable dye laser.

Yet another embodiment of the present invention is depicted in FIG. 6 wherein a tunable dye laser is shown pumped by a solid state laser. The solid state laser provides a very short pumping input to the dye laser. This short pulse input (and output from the dye laser) are important for the lidar imaging case where pulse lengths of 10–50 nm are required (the shorter the better) but not for the communications application where pulses can be approximately 0.5–1 microsecond in length. The solid state laser 96 with its oscillator cavity bounded by mirrors 98, is pumped by a light source 100 which can be either flashlamps as shown in FIG. 2 and 5, or by laser diodes as shown in FIG. 3. A pockels cell 102 (or some other optical element) is used to Q-switch the oscillator, with the firing trigger pulse arriving on line 104. Frequency doubling (or tripling) is accomplished by the optical element 106, KDP, KTP or some other crystal. The output light pulses 108 are reflected by prisms 109 into expanding optics 110, and these pulses irradiate or pump the dye laser 112. This laser 112 in the optical cavity bounded by mirrors 114 is tuned by an electro-optic tuner 116 (or a feedback loop for frequency control as shown in FIGS. 2, 4, and 5) with external tuner control signals entering from line 118. As before, the output signal is monitored by light deflected from the beam splitter 104. The light pulses 120 then leave the transmitter module entering the output optics to be transmitted from the platform toward the ocean or other body of water.

For communications purposes, these signals are tuned to enter an atomic resonance filter receiver by use of the feedback loop 116 which incorporates an atomic resonance filter using the same metal as the receiver; for instance, cesium metal, which operates at wavelengths around 455 and 459 nm. For the purpose of making oceanographic measurements such as those used to prepare the Jerlov Chart shown in FIG. 1, the use of these transmitters is a significant improvement over the prior art of, for example, U.S. Pat. No. 4,963,024 which describes a device primarily suited for measurements at a wavelength of 532 nm.

Figure 7:
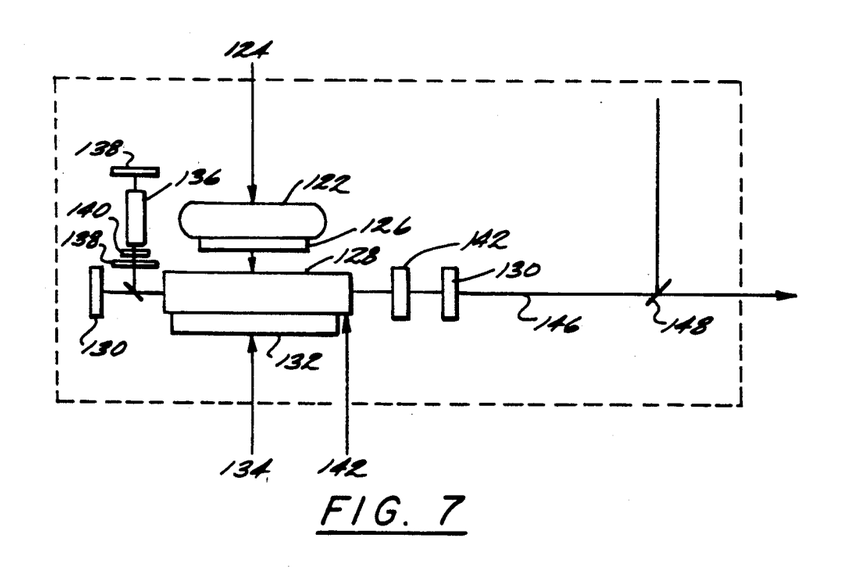
FIG. 7 is a block diagram of a portion of a lidar system in accordance with the present invention depicting an excimer laser operating directly on the C to A transition.

Referring now to FIG. 7 and yet another embodiment of this invention, an excimer laser operating on the C to A transition is shown. The excimer laser is a discharge pumped X-ray preionized XeF laser, normally operating at 351 nm. Power is supplied to the pulse forming network (PFN) 122 from the laser power supply output 124. As mentioned previously, the PFN can be of the solid state type or a self healing liquid PFN. The pulses are then switched out by the switch 126 to electrodes inside the excimer laser cavity 128, bounded by mirrors 130 where they discharge into and excite the excimer gas mixture, producing the lasing medium. Commonly used switches are the thyratron switch, the magnetic switch and the rail gap switch. The lasing gas mixture is preconditioned by the X-ray preionizer 132, and its external power source 134. For this application, however, a portion of the uv light initially generated by the excimer is drawn off to pump a small dye laser 136, bounded by mirrors 138 and a tuner 140 tuned to the output wavelength of interest, but within the emission band of the C to A transition. As noted previously, this tuner 140 can be controlled by a small atomic resonance filter. This arrangement is known in the art as self injection. Other schemes are also available, such as discharge pumping a small KrF excimer laser which, in turn, pumps the dye laser. The light can then be Q-switched out at 142 but this would not normally be necessary, since the pulses generated should be reasonably short enough for most applications. Parasitic power 144 is also required for the gas and cooling water circulating systems, integral with the cavity. As before, the light 146 proceeds out through a beam splitter 148 and into external optics.

Figure 7A:
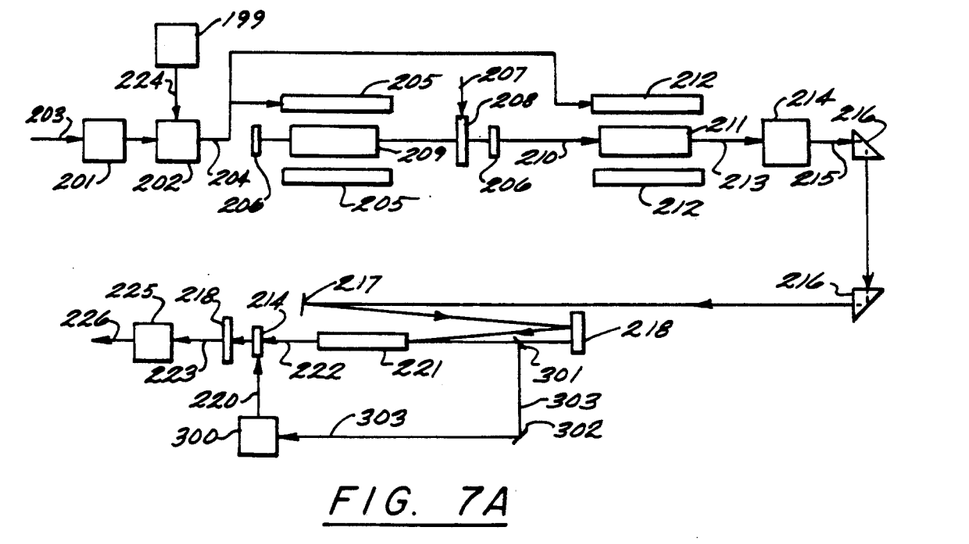
FIGS. 7A and 7B are block diagrams of a portion of a lidar system in accordance with the present invention depicting a frequency doubled Ti:Sapphire laser transmitter pumped by a diode pumped frequency doubled Nd:YAG laser.

Referring now to FIG. 7A, and still another embodiment of the invention, a titanium sapphire laser amplifier is shown with the pumping energy provided by a diode pumped frequency doubled YAG laser. This particular embodiment completely eliminates the use of flashlamps. The configuration shown is a combination of a single Nd:YAG "MOPA" system pumping a tunable Ti:Sapphire laser in an optical cavity. Referring to FIG. 7A, the power supply 201 and power connection 203 provide energy to the pulse forming network 202, triggered by a signal 224 from the pulse timing generator 199. The pulses, generated at the desired transmitter pulse repetition rate, are delivered through the transmission line 204 to two separate diode arrays; the diode arrays 205 consisting of Gallium Aluminum Arsenide diodes (GaAlAs) prepared so that they radiate at a wavelength of 808 nm, and larger diode arrays 212 operating at the same wavelength and pumping the Nd:YAG amplifier rod 211. This wavelength is within an absorption band of Nd:YAG centered at 808 nm. The Nd:YAG oscillator rod 209 is bound by mirrors 206, and the oscillator is switched out by a Q-switch 208, triggered by a signal 207 which is delayed a fixed amount from the signal 224 to the pulse forming network 202, to allow for the maximum energy extraction from the oscillator rod 209. The Q-switched pulse 210 then proceeds into the amplifier rod 211. The amplified pulse 213 passes through the frequency doubling crystal 214 (LiBO$_3$, BBO, KDP or some other appropriate material) where its wavelength is halved to 532 nm. This wavelength is in the middle of the Ti:Sapphire absorption band, and it is able to efficiently pump a Ti:Sapphire rod. The doubled pulse 215 is then passed through two tuning prisms or mirrors 216 and reflected off of a turning mirror 217 and into the Ti:Sapphire cavity off one of the two cavity mirrors 218. This situation is shown in detail in FIG. 7B. The doubled pulse enters the Ti:Sapphire rod 221 from the turning mirror 217 and the cavity mirror 218 at an off axis angle which is very small. A Brewster prism (not shown) can also be used for introducing the pumping light. The pulse generated from this pumping may be Q-switched out as was done in the Nd:YAG cavity with Q-switch 208, or it may be allowed to discharge spontaneously from the resonant cavity at the wavelength determined by the electro optic tuning element 214.

Figure 7B:
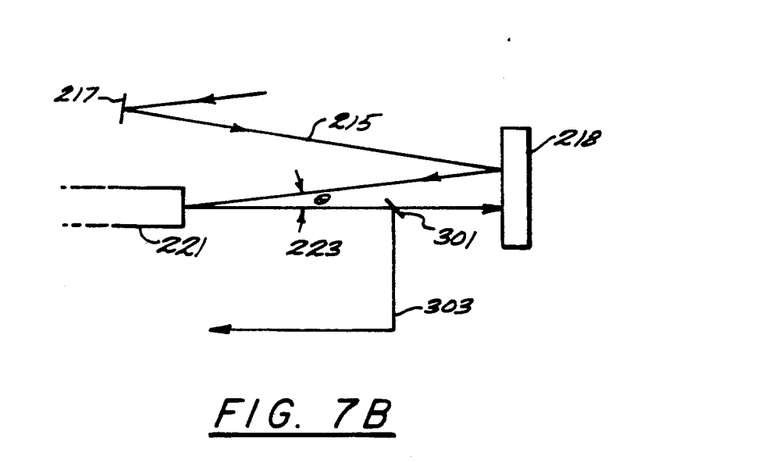

The tuning element 214 may utilize a feedback loop with various embodiments using wave meters and other optical elements as standards in the feedback loop 300 connected electrically to the tuning element through 220. Input to the feedback loop is provided by a sampling mirror 301 which directs a very small part 303 of the pulse 222 diverted into the feedback loop by the turning mirror(s) 302.

Upon exiting the cavity, the light pulse 223 is doubled in frequency doubling crystal 225. This produces light pulses 226 whose wavelengths can range from 380 to 500 nm. It can be seen that this makes possible delivery of nanosecond, high energy pulses at high repetition rates (greater than 100 Hz), high wallplug efficiencies (approximately 3%) and light pulses available at the wavelengths most appropriate for submarine communications and lidar imaging. Since flashlamps are not required, the lifetime of this transmitter can be tens of thousands of hours.

In all of the embodiments of FIGS. 2 through 7A, the imaging camera optics may receive the return signal through a filter. This filter is for use in the daytime and is for rejecting the continuous photocurrent from the sunlight which acts as noise. In the prior art, this filter has been a birefringement Lyot filter, with an acceptance bandwidth of 2-3 nm. In one embodiment, the Lyot filter is replaced by an atomic resonance filter, and the image is registered on the CCD camera. To make this configuration work, laser excitation is required, as is close control of the laser transmitter wavelength. A preferred embodiment is the use of a Faraday Anomalous Dispersion Optical Filter/Tuner (FADOF/FADOT). These elements can act as narrow band filters and electro-optic tuners (see Shay, T., Proc. Int. Conf. Lasers 89, New Orleans, La., Dec. 1989).

Figure 8:
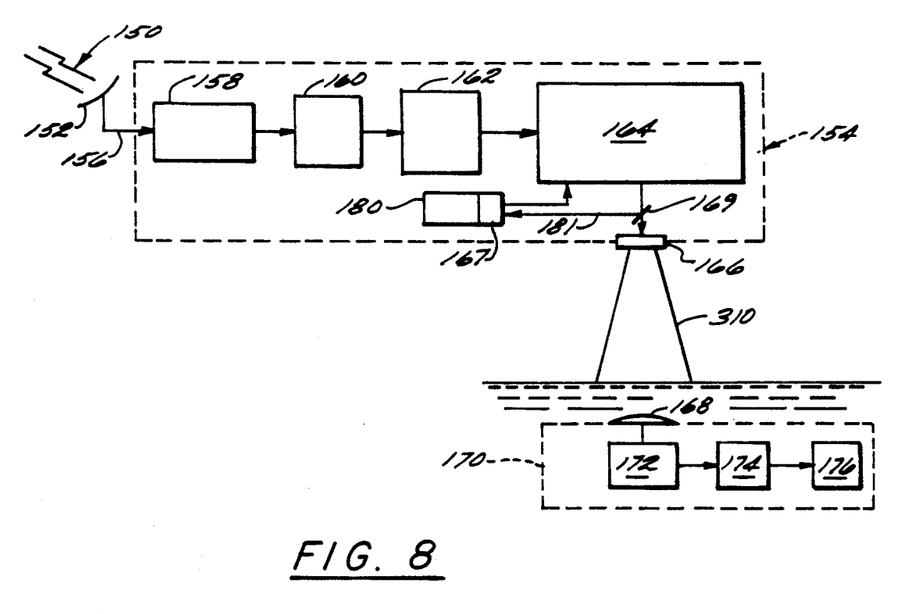
FIG. 8 is a block diagram of an optical communications downlink for underwater laser communication with a narrow band fixed frequency filter which employs a laser transmitter of the type depicted in FIGS. 2, 4, 5, 6, 7 or 7A.

FIG. 8 presents the platform configuration for using the various transmitters described herein for communications purposes (as opposed to the lidar system of FIGS. 2 and 3). In normal practice, a transmission 150 is received by an rf antenna 152 on a airborne platform 154 and sent along transmission lines 156 of the rf (radio frequency) amplifier, receiver and demodulator 158. At 160, the message is processed and put in digital form and sent to the digital pulse coder 162. Digital pulses are then sent to the transmitter module 164 for transmission. The technique for sending messages by pulses transmitted at varying intervals is called "pulse spacing modulation" (See Helstrom, C, IEEE Trans. Inf. Theory, IT-15,31 (1970); Bar-David, I.J. Optical Soc., 63, 166 (1973). The transmissions are transmitted downward by the expanding optics 166 to a filter receiver 168 on an undersea platform 170. The signal is registered on a photo detector 172 decoded at 174 and processed at 176. The lasers described in FIGS. 2, 4, 5, 6, 7 and 7A are all appropriate for laser undersea communications, and can be used modularly in 164 depending on space, power availability etc.

In the embodiment of FIG. 8 the light from transmitter 164 is directed downward through the expanding optics 166 to an atomic resonance filter (QLORD) 168 with cesium vapor. The acceptance wavelengths for this filter are 459 nm and 455 nm in the middle of the optimum transmission band 12, shown in FIG. 1B. The signals are then detected in the photodetector 172. The pulses enter the pulse decoder 174, where they are decoded and the decoded message is stored out or printed on the mission equipment 176.

Cesium vapor operates on atomic transitions. Therefore it can be used as an absolute standard. The laser transmitter 164 is controlled by a feedback loop 180, with a cesium detector 167 viewing a sample of the main output beam 310 sampled by a mirror 69. The use of the QLORD as both electro optic control element and receiver insures that the transmitter will remain in the acceptance bandwidth of the receiver.

Preferably, filter-detectors 167, 168 comprise known atomic resonance or Q-Lord filter-detectors as described in U.S. Pat. No. 4,292,526 which is incorporated herein by reference. A preferred filter-detector utilizing an inert buffer gas is described in U.S. application Ser. No. 446,644 filed Dec. 6, 1989, assigned to the assignee hereof and fully incorporated herein by reference.

Thus, it should be evident from the preceding description that laser imaging lidar and communications systems transmitters have been disclosed which are broad band tunable and can operate at wavelengths for optimum penetration of the ocean and within the acceptance bandwidth of a wide class of filter receivers. These transmitters are far superior to those described in the prior art and are also applicable to wide area measurement of optical oceanographic properties over a broad range of wavelengths.

The several lasers depicted in FIGS. 2-7 are preferably operated in a manner which extracts the maximum energy from the laser in the form of short pulses repeatedly generated in a single pumping cycle. Such a technique is described in detail in U.S. patent application Ser. No. 632,329 filed contemporaneously with this application by R. Norris Keeler and entitled "Imaging Lidar System Employing Multipulse Single and Multiple Gating for Single and Stacked Frames"

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for underwater communication between a first above water location and a second underwater location, the first location including a laser transmitter positioned to transmit laser light toward the second location, comprising:

tuning or setting the operational wavelength of the laser transmitter to a selected wavelength, said selected wavelength being selected so as to optimize the performance of said laser transmitter with at least one of (1) the depth of the water at the second location and (2) the Jerlov Class of the water at the second location;

generating short pulses of light from the laser transmitter in accordance with a selected message to be communicated;

projecting said short pulses of light toward the underwater location and at first filter receiver means associated with the underwater location;

detecting said pulses of light using said first filter receiver mans; and converting said detected pulses of light to said selected message.

2. The method of claim 1 wherein:

said selected wavelength is in the range of wavelengths defined by the blue region of the visible optical spectrum.

3. The method of claim 1 wherein:

said laser transmitter comprises a laser transmitter selected from the group consisting of flashlamp solid state or excimer pumped tunable dye lasers, diode and flashlamp pumped solid state lasers, diode pumped solid state lasers, solid state pumped solid state lasers and excimer lasers operating on the C to A transition.

4. The method of claim 3 wherein:

said selected wavelength is in the range of wavelengths defined by the blue region of the visible optical spectrum.

5. The method of claim 1 wherein:

said selected wavelength is selected to match the acceptance wavelength of said first filter receiver means.

6. The method of claim 1 including:
a feedback loop associated with the first location to insure that the laser transmitter generates light in a bandwidth acceptable to said first filter receiver means.

7. The method of claim 6 wherein:
said feedback loop includes a second filter receiver means.

8. The method of claim 7 wherein:
said first and second filter receiver means comprise atomic resonance filter detectors.

9. The method of claim 7 including:
inert buffer gas in at least one of said atomic resonance filter detectors.

10. The method of claim 8 wherein:
said atomic resonance filter detectors include cesium vapor therein.

11. The method of claim 1 wherein:
said first filter receiver means comprises an atomic resonance filter detector.

12. The method of claim 11 including:
inert buffer gas in said atomic resonance filter detector.

13. The method of claim 11 wherein:
said atomic resonance filter detector includes cesium vapor therein.

14. The method of claim 1 including the step of:
using a second filter receiver means as a control element for matching the selected wavelength of said laser transmitter to the wavelength of said first filter receiver means.

15. The method of claim 1 wherein:
said first location comprises an airborne platform.

16. The method of claim 1 including the steps of:
initially receiving said selected message as a radio frequency (rf) message;
converting said rf message to a digital message; and
converting said digital message to a digital pulse coded message for transmission by said laser transmitter.

17. An apparatus for underwater communication between a first above water location and a second underwater location, the first location including a laser transmitter positioned to transmit laser light toward the second location, comprising:
means for tuning or setting the operational wavelength of the laser transmitter to a selected wavelength, said selected wavelength being selected so as to optimize the performance of said laser transmitter with at least one of (1) the depth of the water at the second location and (2) the Jerlov Class of the water at the second location;
means for generating short pulses of light from the laser transmitter in accordance with a selected message to be communicated;
means for projecting said short pulses of light toward the underwater location and at first filter receiver means associated with the underwater location;
means for detecting said pulses of light using said first filter receiver means; and
means for converting said detected pulses of light to said selected message.

18. The apparatus of claim 17 wherein:
said selected wavelength is in the range of wavelengths defined by the blue region of the visible optical spectrum.

19. The apparatus of claim 17 wherein:
said laser transmitter comprises a laser transmitter selected from the group consisting of flashlamp solid state or excimer pumped tunable dye lasers, diode and flashlamp pumped solid state lasers, diode pumped solid state lasers, solid state pumped solid state lasers and excimer lasers operating on the C to A transition.

20. The apparatus of claim 17 wherein
said selected wavelength is selected to match the acceptance wavelength of said first filter receiver means.

21. The apparatus of claim 17 including:
a feedback loop associated with the first location to insure that the laser transmitter generates light in a bandwidth acceptable to said first filter receiver means.

22. The apparatus of claim 21 wherein:
said feedback loop includes a second filter receiver means.

23. The apparatus of claim 22 wherein:
said first and second filter receiver means comprise atomic resonance filter detectors.

24. The apparatus of claim 23 including:
inert buffer gas in at least one of said atomic resonance filter detectors.

25. The apparatus of claim 23 wherein:
said atomic resonance filter detectors include cesium vapor therein.

26. The apparatus of claim 17 wherein:
said first filter receiver means comprises an atomic resonance filter detector.

27. The apparatus of claim 26 including:
inert buffer gas in said atomic resonance filter detector.

28. The apparatus of claim 26 wherein:
said atomic resonance filter detector includes cesium vapor therein.

29. The apparatus of claim 17 including:
second filter receiver means comprising a control element for matching the selected wavelength of said laser transmitter to the wavelength of said first filter receiver means.

30. The apparatus of claim 17 including:
means for initially receiving said selected message as a radio frequency (rf) message;
means for converting said rf message to a digital message; and
means for converting said digital message to a digital pulse coded message for transmission by said laser transmitter.

* * * * *